March 22, 1927.
N. A. HALLWOOD
SCALE
Filed May 12, 1925
1,622,106
2 Sheets-Sheet 2
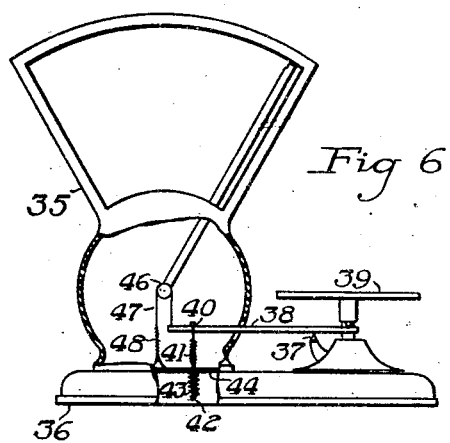
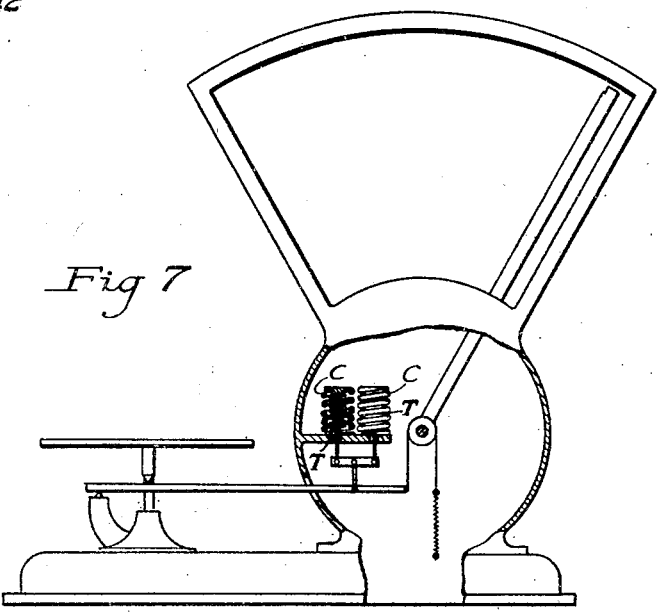
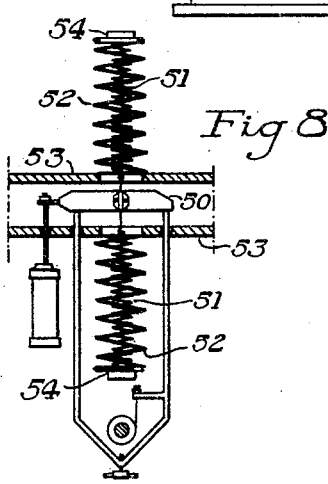
INVENTOR
Nathan A. Hallwood,
by Byrnes, Stebbins & Parmelee,
his attys.

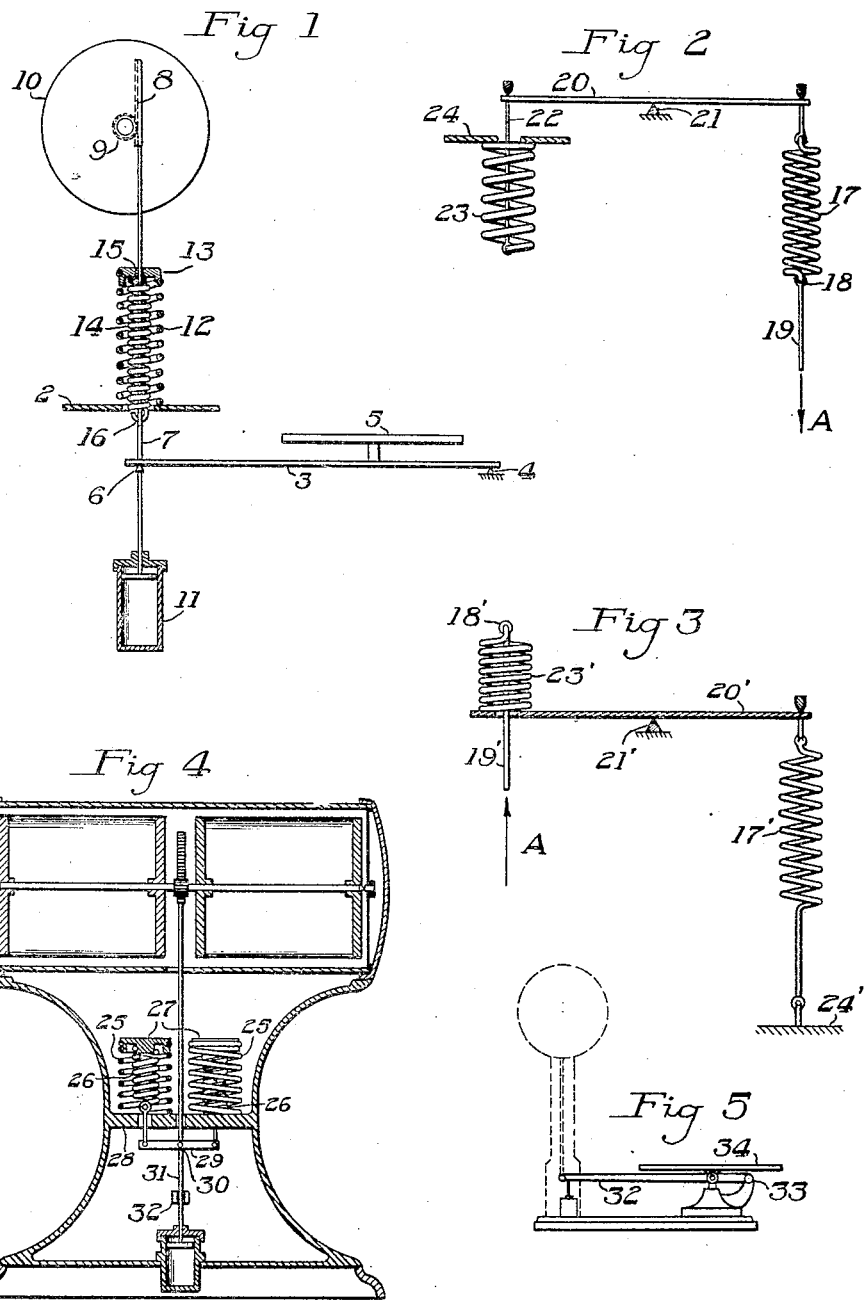

Patented Mar. 22, 1927.

1,622,106

UNITED STATES PATENT OFFICE.

NATHAN A. HALLWOOD, OF PITTSBURGH, PENNSYLVANIA, ASSIGNOR TO McKENNA-HORIX MANUFACTURING COMPANY, OF PITTSBURGH, PENNSYLVANIA, A CORPORATION OF PENNSYLVANIA.

SCALE.

Application filed May 12, 1925. Serial No. 29,656.

The present invention relates broadly to weighing scales, and more particularly to scales of the type utilizing a spring or springs as part of the controlling or actuating mechanism, irrespective of whether the scales are of the computing, heavy duty, spring balance or other type, the utility of the invention not being limited with respect to the type of scale with which it is utilized.

It is well recognized that temperature changes, unless compensated, will impair the accuracy of scales utilizing springs as a part of the actuating mechanism. Such springs undergo a change in length for each change in temperature. Such changes in the length of the springs not only change the tension exerted thereby, but also the helix angle of the springs and the modulus of elasticity. This change in tension by reason of temperature variations has heretofore been recognized, and efforts have been made to negative the effect of temperature variations by utilizing opposing springs having characteristics such that the change in length of the material constituting one spring will be exactly off-set or counteracted by the change in the length of the material constituting the other spring. By making an attachment to a point common to both springs, this point may be kept constant by reason of the thermometrical balance established by the opposing springs, and it may therefore be utilized for maintaining a pointer or other indicator on the zero division of the scale.

With structures utilizing opposed springs of the character referred to, I have found that there is no substantial difficulty encountered so long as the temperature variations and the loads imposed on the scales remain relatively low. Where, however, such scales are subjected to comparatively greater changes in temperature, and to heavier loads, difficulty is encountered by reason of the changes in the modulus of elasticity and helix angle of the springs, these changes both being of the opposite order in the respective springs. It will be apparent, therefore, that the use of opposed springs, whether of the tension or of the compression type, amplifies the one difficulty referred to, for the reason that as one spring is acted upon in such manner as to cause it to approach its elastic limit, the other spring is acted upon in such manner that it approaches its resting position.

It is one of the objects of the present invention to provide temperature compensating means for scales employing springs as part of the actuating mechanism, the compensating being of such nature that not only is the index maintained on the zero division of the scale at all times, but the objections heretofore encountered by reason of changes in the modulus of elasticity and the helix angle are entirely obviated.

In the accompanying drawings I have shown, for purposes of illustration only, and in more or less diagrammatic form, different embodiments of the present invention, it being understood that the drawings do not define the limits of my invention as changes in the construction and operation disclosed therein may be made without departing either from the spirit of the invention or the scope of my broader claims.

In the drawings:—

Figure 1 is a diagrammatic sectional view through a scale of the drum type illustrating the applicability of the present invention thereto;

Figure 2 is a diagrammatic view illustrating a modified arrangement of the compensating springs;

Figure 3 is a view similar to Figure 2 illustrating, however, a condition under which the reverse action under load is exerted on the springs;

Figure 4 is a diagrammatic view of a drum scale showing still another embodiment of the present invention;

Figure 5 is a detail elevational view, largely diagrammatic, illustrating the points of attachment of the load carrying member to the scale, and the fulcrum points therefor;

Figure 6 is a view illustrating the applicability of the invention to a scale of the fan type;

Figure 7 is a view similar to Figure 6 showing a double arrangement of springs for a fan type scale, as illustrated generally in Figure 4, and Figure 8 is a detail view showing still another form of the invention.

It has heretofore been pointed out that the utility of the invention is not limited with respect to the particular type of scale with which it is employed. The invention contemplates an inter-relationship between springs, the relationship being such that there is obtained an automatic compensation for changes in the springs due to temperature variations, irrespective of the particular scale structure with which the springs are used, or the particular manner of mounting or assembling the springs.

In the embodiment of the invention illustrated in Figure 1, there is shown a portion 2 of the frame of a scale of the drum type. Such scales ordinarily utilize a suitable form of load carrying member 3, here illustrated as being in the form of a beam, having a fulcrum 4 and a pan 5 adapted to receive the material or articles to be weighed. At a suitable point the beam 3 has a connection 6 with the bar 7 having a rack portion 8 adjacent its upper end meshing with a pinion 9 which revolves the computing chart 10, as well understood in the art. The lower end of the bar 7 ordinarily cooperates with suitable means, such, for example, as a dash pot 11, for the purpose of dampening oscillations of the drum 10 to the desired extent.

In accordance with the present invention advantage is taken of a combination of springs so connected as to obtain a thermometrical balance having the desirable characteristics referred to. In this figure the balance is shown as obtained by employing an outer compression spring 12 having one end thereof resting on the frame 2 of the scale. The opposite end may adjustably cooperate with a nut 13 adapted to be threaded into or out of the spring whereby the effective length thereof may be varied at will. Within the compression spring 12 is a tension spring 14 having its upper end cooperating with an adjusting device 15 whereby the effective length of the tension spring may be varied at will. The opposite end of the tension spring has a point of attachment 16 to the bar 7. The present invention contemplates the utilization of springs constructed of such lengths and material that each of the springs will have a similar and corresponding variation in the length of the material thereof under similar variations of temperature. The adjusting devices 13 and 15 referred to may be utilized for exactly adjusting the springs so that the overall changes in the length of the two springs can be compensated. By reason of this construction, assuming a rise in temperature, the compression spring and the tension spring will both tend to increase in length. The lower end of the compression spring is fixed against movement, and the lower end of the tension spring is secured to the bar 7, which must remain stationary in order to maintain the zero division on the drum 10 in proper relation to the reading line. This action is permitted even with the increase in length of the springs for the reason that the adjusting devices 13 and 15 constitute a common point of attachment between the two springs, which point of attachment is free to move up or down in accordance with variations in the lengths of the springs.

It will be apparent from the foregoing that by reason of this cooperative inter-relation of the springs it is possible to provide an automatic thermometrical balance compensating for changes in the length of the springs due to temperature variations. At the same time, due to the relationship between the springs, which is such that the operating characteristics of the springs with respect to helix angle and modulus of elasticity are oppositely affected by changes both of weight and temperature, one of the springs will exactly counteract the other as to these changes, so that the unit effect of the springs remains constant.

In Figure 2 there is illustrated a combination of springs operating to obtain the same results as those referred to, the springs, however, being shown in a different relationship in order to illustrate the flexibility of the present invention. In accordance with this embodiment there is shown a tension spring 17 having a point of attachment 18 to a suitable load carrying member 19 adapted, under the influence of a load, to move downwardly in the direction of the arrow A. The opposite end of the tension spring has a pivotal connection to one end of a lever 20 having a pivotal mounting 21. The opposite end of the lever 20 in turn has a suitable connection 22 with one end of a compression spring 23, the opposite end of which bears against a fixed support 24. It will be apparent that the respective points of attachments with the springs may be made adjustable, as described in connection with Figure 1, in order that the overall variations in length of the material of the springs may be brought into exactly the desired relation.

In Figure 3 of the drawings there is illustrated an arrangement of springs similar to that shown in Figure 2, except that the operation of the springs under load occurs in exactly the opposite manner. Parts of this figure corresponding to parts already described in Figure 2 are designated by the same reference characters having a prime affixed thereto. With this arrangement of the springs the load applied to the scale will tend to act in the direction indicated by the arrow A' to relieve the load on the springs. Thus, as the weight of the material being weighed increases, the load on the compression spring 23' and the tension spring 17' will be correspondingly decreased, this operation being the reverse of that shown in Figure 2.

Figure 4 of the drawings illustrates a slightly modified embodiment of the invention adaptable for use with scales of the drum type where the available room is limited. In such cases two or more unit spring assemblies may be utilized, and the weight proportionately distributed therebetween or thereamong. In the form shown, I have provided two unit assemblies, each comprising a compression spring 25 and a tension spring 26, the springs of each unit having a common floating point of attachment 27. The compression springs each rest on a fixed platform or portion of the scale frame 28, and the lower ends of the tension springs have an interconnection 29 which, in turn, has a connection 30 with the bar 31 of the scale. The scale beam 32 is attached to the bar 31, as clearly shown in Figure 5, and is provided with a fulcrum 33 and a loading point or receptacle 34. With this construction the compensating action of each of the unit assemblies will be the same as that referred to, but the overall dimensions of the springs, due to the distribution of weight, may be made less, and the entire scale thus assembled more compactly.

As illustrating the applicability of the invention to scales of the fan type, I have shown in Figure 6 a fan type scale 35 having a base 36 carrying a fulcrum 37 for the beam 38. This beam has a loading point or platform 39 and on the opposite side of the fulcrum has an attachment 40 with one end of a tension spring 41. The opposite end of the tension spring has a connection 42 to the lower end of a compression spring 43, the upper end of which bears against a fixed portion 44 of the scale frame. It will be apparent that the means 42 constitutes a common floating point of attachment between the springs which are here shown as being mounted in axial alignment but not in nesting relationship. The particular arrangement of the springs may, however, be varied at will without disturbing the compensating action obtained thereby. The scale beam 38 may operate the indicator 45 in known manner, as by providing the indicator with a trunnion 46 around which passes a strap 47 rigidly fixed to the indicator trunnion at its intermediate portion. At one end the strap cooperates with a weight or spring 48, while at its opposite end it is attached to a portion of the scale beam.

In Figure 7 there is shown a scale of the fan type having two unit assemblies, each embodying a tension spring T and a compression spring C, connected to each other and to the scale parts in any desired manner. By utilizing a plurality of units the size of each unit may be correspondingly decreased.

In Figure 8 the invention is illustrated as applied in the general manner shown in the patent to H. S. Hallwood, No. 1,195,213 of August 22, 1916, in that the springs are applied on opposite sides of a part to be controlled. In accordance with this form of my invention, a unit spring assembly is shown on each side of a connection 50 constituting part of the load carrying member or attached thereto in any desired manner. The two tension springs 51 are shown as connected to opposite sides of the connection 50, while the two compression springs 52 are shown as resting at one end against a fixed part of the frame 53. Each unit assembly has a common point of attachment 54 as before described. With such an arrangement, the action of each unit assembly is always constant, thereby resulting in absolute accuracy over the entire temperature or weighing range to which the scale may be subjected.

The advantages of the present invention arise from a combination of springs so cooperating as to establish a thermometrical balance, and so related that objections heretofore encountered by reason of changes in helix angles or modulus of elasticity are entirely obviated.

I claim:

1. In a scale, a load carrying member, a compression spring, a tension spring, said springs having one end interconnected and being made of such lengths and material that each spring will have a substantially equal change in length and tension under variations of temperature, and a support for the free end of one of the springs, the load carrying member being operatively connected to the free end of the other spring in such manner that each of said springs resist movement of said member under load.

2. In a scale, a load carrying member, a compression spring, a tension spring, said springs having one end interconnected and being made of such lengths and material that each spring will have a substantially equal change in length and tension under variations of temperature, and a support for the free end of one of the springs, the load carrying member being operatively connected to the free end of the other spring, there being means for adjusting the relative effective length of the springs.

3. In a scale, a load carrying member, a compression spring, a tension spring, means operatively interconnecting one end of each of the springs, said spring being of such lengths and material that each spring will have a substantially equal change in length and tension under variations of temperature, and a support for the free end of one of the springs, the load carrying member being operatively connected to the free end of the other spring in such manner that each of said springs resists movement of said member under load.

4. In a scale, a load carrying member, a compression spring, a tension spring, means operatively interconnecting one end of each of the springs, said springs being nested and being of such lengths and material that each spring will have a substantially equal change in length and tension under variations of temperature, and a support for the free end of one of the springs, the load carrying member being operatively connected to the free end of the other spring.

5. In a scale, a load carrying member, a compression spring, a tension spring, means operatively interconnecting one end of each of the springs, said springs being arranged in axial alignment and being of such lengths and material that each spring will have a substantially equal change in length and tension under variations of temperature, and a support for the free end of one of the springs, the load carrying member being operatively connected to the free end of the other spring.

6. In a scale, a load carrying member, a thermometrical balance for said member comprising a compression spring and a tension spring having one end interconnected, said springs being of substanially the same material and of substantially the same length whereby the springs will have a substantially equal change in linear length and tension under variations of temperature, and a support for the free end of one of the springs, said load carrying member being operatively connected to the free end of the other spring in such manner that each of said springs resists movement of said member under load.

7. A thermometrical balance for scales, comprising a unit assembly, of a tension spring and a compression spring having similar length variations under temperature changes and having one end interconnected in such manner that one spring supports the other, there being means for the attachment of a load carrying member to the free end of one of said springs and a support for the free end of the other of said springs.

In testimony whereof I have hereunto set my hand.

NATHAN A. HALLWOOD.